(12) United States Patent
Hokazono et al.

(10) Patent No.: US 9,511,680 B2
(45) Date of Patent: Dec. 6, 2016

(54) VEHICLE BATTERY MOUNTING STRUCTURE

(71) Applicant: TOYOTA JIDOSHA KABUSHIKI KAISHA, Toyota-shi (JP)

(72) Inventors: Kiyoshi Hokazono, Toyota (JP); Kenichiro Yoshimoto, Toukai (JP); Takeharu Matsuno, Miyoshi (JP); Shingo Hirata, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/877,289

(22) Filed: Oct. 7, 2015

(65) Prior Publication Data

US 2016/0114699 A1   Apr. 28, 2016

(30) Foreign Application Priority Data

Oct. 23, 2014  (JP) ................... 2014-216288

(51) Int. Cl.
*B60K 1/04* (2006.01)
*B60L 11/18* (2006.01)

(52) U.S. Cl.
CPC .............. *B60L 11/1877* (2013.01); *B60K 1/04* (2013.01)

(58) Field of Classification Search
CPC ............... B60K 1/00; B60K 1/04; B60K 1/08; B60L 11/1877
See application file for complete search history.

(56) References Cited

U.S. PATENT DOCUMENTS

| 4,930,659 A | * | 6/1990 | Sauber | ................... B62D 25/24 |
| | | | | 220/367.1 |
| 2008/0169676 A1 | * | 7/2008 | Hanson | ............... H01M 2/1083 |
| | | | | 296/187.01 |

FOREIGN PATENT DOCUMENTS

JP           4924684        4/2012

* cited by examiner

*Primary Examiner* — John Walters
*Assistant Examiner* — James Triggs
(74) *Attorney, Agent, or Firm* — Oblon, McClelland, Maier & Neustadt, L.L.P.

(57) ABSTRACT

The present invention provides a vehicle battery mounting structure including: a lower frame made of fiber-reinforced resin that has a first open portion for water drainage and configures, together with an upper frame, a battery frame that supports a battery; a lower reinforcement made of metal that has a second open portion for water drainage having a smaller open area than the first open portion, the lower reinforcement being joined to the lower frame in a state in which the second open portion is communicated with the first open portion; and an insulating grommet that is formed in the shape of a ring having an upper flange and a lower flange and that is disposed at the lower reinforcement as a result of a peripheral edge portion configuring the second open portion of the lower reinforcement being fitted between the upper flange and the lower flange.

7 Claims, 4 Drawing Sheets

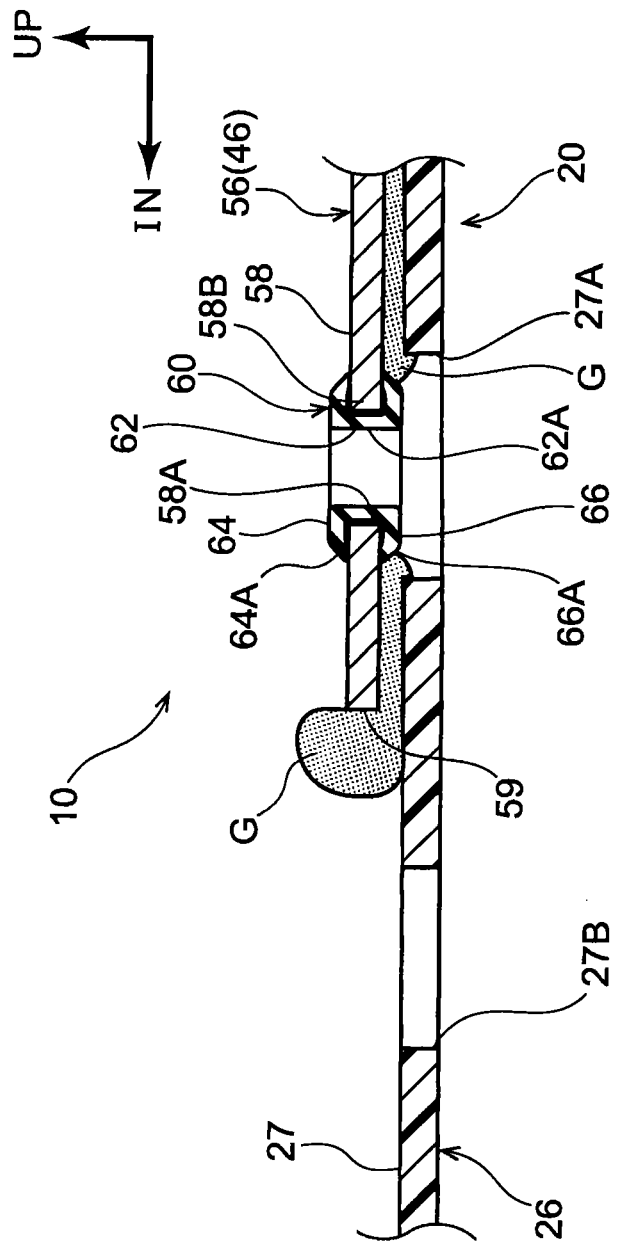

VEHICLE BATTERY MOUNTING STRUCTURE

CROSS-REFERENCE TO RELATED APPLICATION

This application is based on and claims the benefit of priority of Japanese Patent Application No. 2014-216288, filed on Oct. 23, 2014, the entire contents of which are incorporated herein by reference.

BACKGROUND

Technical Field

The embodiment discussed herein is related to a vehicle battery mounting structure.

Related Art

Patent document 1 (Japanese Patent No. 4,924,684), for example, discloses a battery mounting structure for an electric automobile where a support member made of metal is secured to the bottom surface of a battery case made of resin in which is housed a battery for driving the electric automobile, with the battery case being supported on the vehicle body by the support member.

However, in the battery mounting structure disclosed in patent document 1 (Japanese Patent No. 4,924,684), if an open portion (through hole) for water drainage is formed in a region where a member made of resin and a member made of metal overlay one another, there is the concern that rusting will occur in the member made of metal due to galvanic corrosion. In this way, in a battery mounting structure having a member made of resin and a member made of metal, the configuration for controlling the occurrence of rusting caused by galvanic corrosion has room for improvement.

Therefore, it is an object of the present invention to obtain a vehicle battery mounting structure that can control the occurrence of rusting caused by galvanic corrosion even when an open portion for water drainage is formed in a region where a member made of resin and a member made of metal overlay one another.

SUMMARY OF THE INVENTION

A vehicle battery mounting structure of a first aspect includes: a lower frame made of fiber-reinforced resin that has a first open portion for water drainage, the lower frame configuring, together with an upper frame, a battery frame that supports a battery; a lower reinforcement made of metal that has a second open portion for water drainage having a smaller open area than the first open portion, the lower reinforcement being joined to the lower frame in a state in which the second open portion is communicated with the first open portion; and an insulating grommet that is formed in the shape of a ring having an upper flange and a lower flange, the grommet being disposed at the lower reinforcement as a result of a peripheral edge portion configuring the second open portion of the lower reinforcement being fitted between the upper flange and the lower flange.

According to the vehicle battery mounting structure of the first aspect, the second open portion for water drainage formed in the lower reinforcement made of metal is communicated with the first open portion for water drainage formed in the lower frame made of fiber-reinforced resin. Additionally, the ring-shaped insulating grommet is fitted into the second open portion. Consequently, water droplets entering the battery frame are drained to the outside from the first open portion and the grommet fitted into the second open portion. Furthermore, because of the grommet, the occurrence of rusting caused by galvanic corrosion in the second open portion of the lower reinforcement is controlled.

Furthermore, a vehicle battery mounting structure of a second aspect is the vehicle battery mounting structure according to the first aspect, wherein the lower reinforcement is joined by an adhesive to an upper surface of the lower frame, and an outer rim portion of the lower flange is covered by the adhesive, which has protruded out toward the first open portion.

According to the vehicle battery mounting structure of the second aspect, the outer rim portion of the lower flange of the grommet is covered by the adhesive, which has protruded out toward the first open portion. In other words, the undersurface of the lower reinforcement exposed from the first open portion is covered by the adhesive. Consequently, the occurrence of rusting caused by galvanic corrosion in the area around the second open portion is controlled or prevented compared to a configuration where the undersurface of the lower reinforcement exposed from the first open portion is not covered by the adhesive.

Furthermore, a vehicle battery mounting structure of a third aspect is the vehicle battery mounting structure according to the first aspect, wherein surfaces of an outer rim portion of the upper flange and an outer rim portion of the lower flange that are not in contact with the lower reinforcement are each sloping surfaces.

According to the vehicle battery mounting structure of the third aspect, the surfaces of the outer rim portion of the upper flange and the outer rim portion of the lower flange that are not in contact with the lower reinforcement are each sloping surfaces. Consequently, it becomes easier for the grommet to be fitted into the second open portion and harder for the grommet to come out from the second open portion compared to a configuration where the surfaces of the outer rim portion of the upper flange and the outer rim portion of the lower flange that are not in contact with the lower reinforcement are not sloping surfaces.

A vehicle battery mounting structure of a fourth aspect is the vehicle battery mounting structure according to the first aspect, wherein the grommet is equipped with a cylinder portion; the upper flange is integrally disposed, extending outward in a radial direction, at an upper end portion of the cylinder portion; the lower flange is integrally disposed, extending outward in the radial direction, at a lower end portion of the cylinder portion; and the cylinder portion is inserted into the second open portion.

According to the vehicle battery mounting structure of the fourth aspect, the peripheral edge portion configuring the second open portion of the lower reinforcement is fitted between the upper flange and the lower flange of the grommet as a result of the cylinder portion of the grommet being inserted into the second open portion.

A vehicle battery mounting structure of a fifth aspect is the vehicle battery mounting structure according to the fourth aspect, wherein the grommet is made of rubber and is elastically deformable.

According to the vehicle battery mounting structure of the fifth aspect, the grommet is made of rubber and is elastically deformable. For this reason, the grommet is attached to the peripheral edge portion configuring the second open portion of the lower reinforcement as a result of the grommet being elastically deformed and inserted into the second open portion.

A vehicle battery mounting structure of a sixth aspect is the vehicle battery mounting structure according to the fourth aspect, wherein an outer diameter of the cylinder portion is the same as an inner diameter of the second open portion.

According to the vehicle battery mounting structure of the sixth aspect, the outer diameter of the cylinder portion is the same as the inner diameter of the second open portion, so the cylinder portion of the grommet is inserted into the second open portion without any gap between them.

A vehicle battery mounting structure of a seventh aspect is the vehicle battery mounting structure according to the second aspect, wherein a distal end portion of the lower reinforcement that is disposed on the upper surface of the lower frame is covered by the adhesive, which has swollen up from the upper surface of the lower frame.

According to the vehicle battery mounting structure of the seventh aspect, the distal end portion of the lower reinforcement that is disposed on the upper surface of the lower frame is covered by the adhesive, which has swollen up from the upper surface of the lower frame, so the occurrence of rusting caused by galvanic corrosion at the distal end portion of the lower reinforcement is controlled.

Additionally, according to the vehicle battery mounting structure of the first aspect, even when an open portion for water drainage is formed in a region where a member made of resin and a member made of metal overlay one another, the occurrence of rusting caused by galvanic corrosion can be controlled.

Furthermore, according to the vehicle battery mounting structure of the second aspect, even when an open portion for water drainage is formed in a region where a member made of resin and a member made of metal overlay one another, the occurrence of rusting caused by galvanic corrosion can be controlled.

Furthermore, according to the vehicle battery mounting structure of the third aspect, it can be made easy for the grommet to be fitted into the second open portion of the lower reinforcement and hard for the grommet to come out from the second open portion.

BRIEF DESCRIPTION OF THE DRAWINGS

FIG. 4 is an enlarged front sectional view showing part of the vehicle battery mounting structure pertaining to the embodiment.

DETAILED DESCRIPTION OF THE INVENTION

Figure 1:
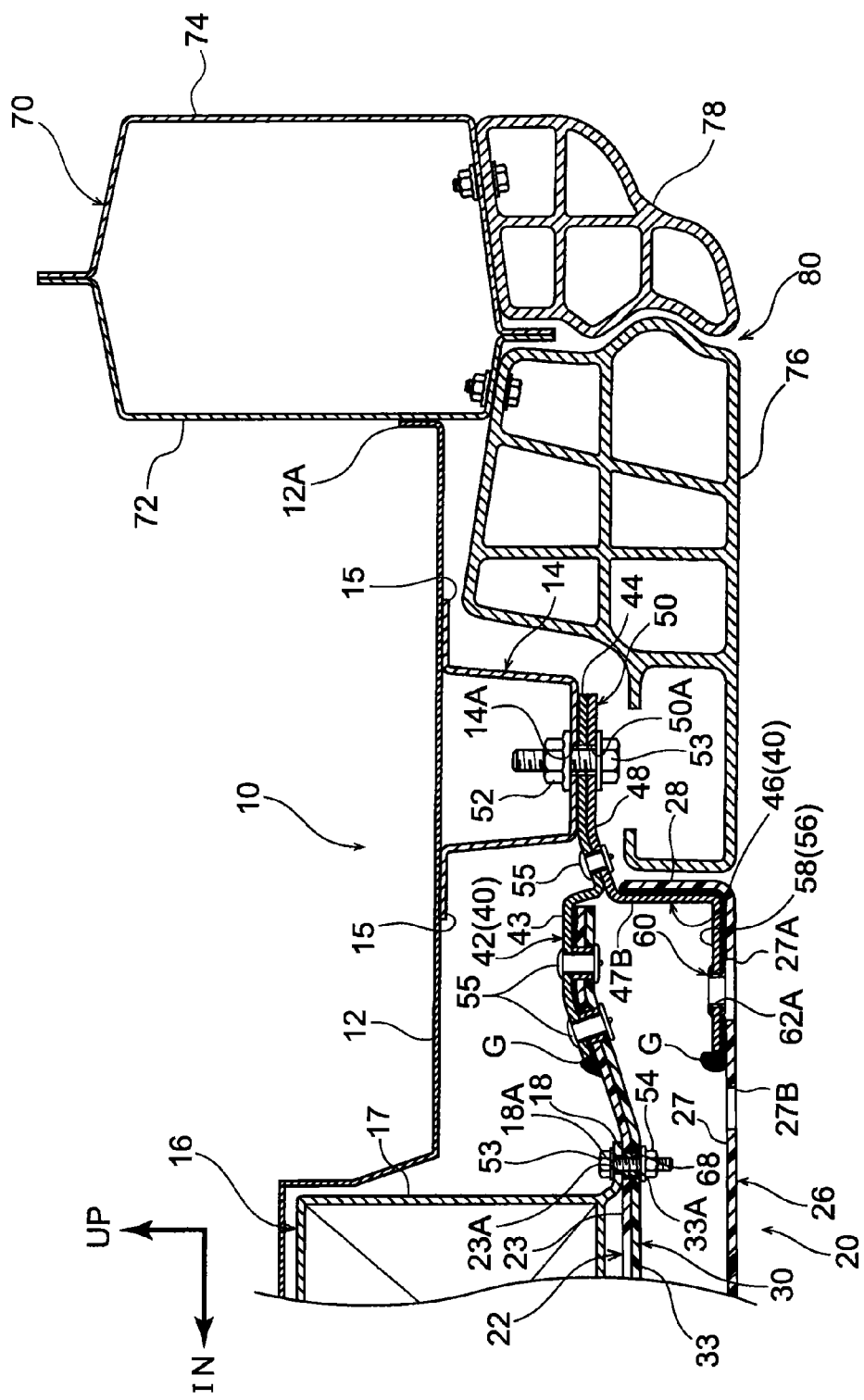
FIG. 1 is a front sectional view showing a vehicle battery mounting structure pertaining to an embodiment of the present invention.

An embodiment pertaining to the present invention will be described in detail below on the basis of the drawings. It should be noted that, for convenience of description, arrow UP appropriately shown in the drawings indicates a vehicle body upward direction, arrow FR indicates a vehicle body forward direction, and arrow IN indicates inward in a vehicle width direction. Furthermore, unless otherwise noted, when the directions of up and down, front and rear, and right and left are used in the following description, these will be understood to mean up and down in a vehicle body up and down direction, front and rear in a vehicle body front and rear direction, and right and left in a vehicle body right and left direction (the vehicle width direction). Moreover, although the drawings show the left side of a vehicle body as seen from the vehicle body front side, description regarding the right side of the vehicle body will be appropriately omitted because the right side of the vehicle body is identical to the left side of the vehicle due to the vehicle body being bilaterally symmetrical.

As shown in FIG. 1, a right and left pair of under members 14 are joined to the undersurface of a floor panel 12. The floor panel 12 is made of metal and configures the floor portion of a vehicle body. The under members 14 extend in the vehicle body front and rear direction and configure a vehicle body skeletal structure. The under members 14 are each formed of metal in a cross-sectionally substantially hat shape. Flange portions 15 that jut out in the vehicle width direction are joined and fastened by welding, for example, to the undersurface of the floor panel 12 on both vehicle width direction end portion sides of each of the under members 14.

Furthermore, plural through holes 14A for passing through flange bolts 53 described later are formed in each of the under members 14 along the longitudinal direction (the vehicle body front and rear direction). Additionally, weld nuts 52 are disposed, coaxially with the through holes 14A, on the upper surfaces of the under members 14.

A vehicle battery mounting structure 10 pertaining to the present embodiment applied to a vehicle such as an electric automobile has a battery frame (a stack frame) 20 that supports from the vehicle body lower side a fuel cell stack 16 serving as a battery. The battery frame 20 is placed on the vehicle body lower side of the floor panel 12 and is molded of carbon fiber-reinforced resin material (CFRP), for example.

The fuel cell stack 16 has a casing portion 17 formed of metal (or it may also be resin) in the shape of a rectangular box. Leg portions 18 that jut outward in the vehicle width direction are formed integrally with the casing portion 17 in plural predetermined positions on the lower end peripheral edge portion of the casing portion 17. Additionally, through holes 18A for passing through the flange bolts 53 described later are formed in the leg portions 18.

Figure 2:
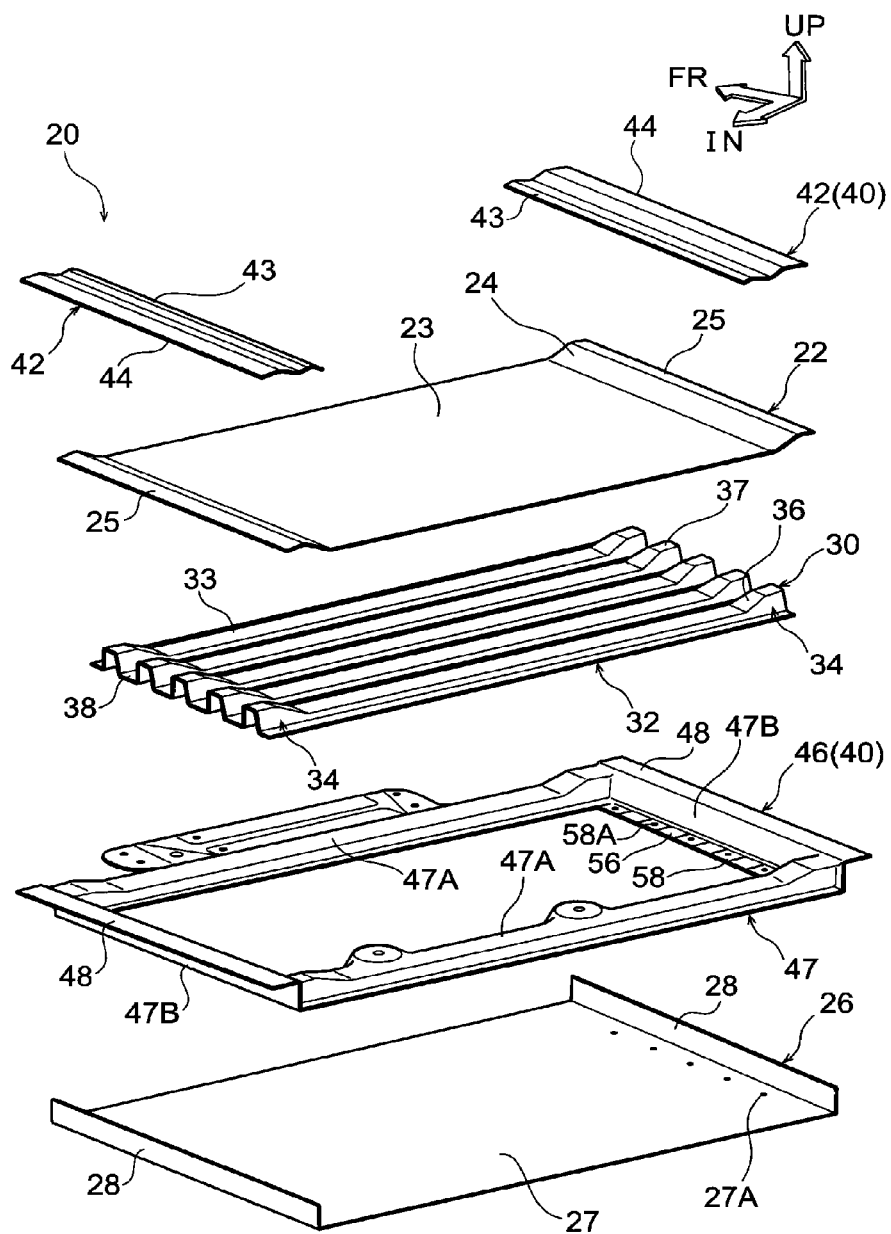
FIG. 2 is an exploded perspective view showing a battery frame and a reinforcement that configure the vehicle battery mounting structure pertaining to the embodiment.

As shown in FIG. 1 and FIG. 2, the battery frame 20 is configured to include an upper frame 22, a lower frame 26, and a core frame 30. The lower frame 26 is disposed on the vehicle body lower side of the upper frame 22. The core frame 30 is disposed between the upper frame 22 and the lower frame 26.

The upper frame 22 has a top plate 23, sloping walls 24, and flange portions 25. The top plate 23 is formed in the shape of a rectangular flat plate and is placed along the horizontal direction. The sloping walls 24 are each formed in the shape of a rectangular flat plate and are continuously disposed (formed) on both vehicle width direction end portions (outside end portions) of the top plate 23. The sloping walls 24 are formed integrally with the top plate 23 and slope obliquely upward and outward in the vehicle width direction in such a way as to follow sloping walls 36 described later. The flange portions 25 are each formed in the shape of a rectangular flat plate and are continuously disposed (formed) on both vehicle width direction end portions of the sloping walls 24. The flange portions 25 are formed integrally with the sloping walls 24 and extend substantially horizontally outward in the vehicle width direction in such a way as to follow upper walls 37 described later.

The lower frame 26 has a bottom plate 27 and side wall portions 28. The bottom plate 27 is formed in the shape of a rectangular flat plate and is placed along the horizontal direction. The side wall portions 28 are each formed in the shape of a rectangular flat plate and are continuously disposed (formed) on both vehicle width direction end portions (outside end portions) of the bottom plate 27. The side wall portions 28 are formed integrally with the bottom plate 27 and extend substantially vertically toward the vehicle body upper side. It should be noted that the height of the side wall portions 28 is substantially the same as the height of side wall portions 47B of a lower reinforcement 46 described later.

As shown in FIG. 2, the core frame 30 has a main body portion 32 and projecting portions 34. Ridge portions 33 are formed in plural rows (e.g., 5 rows) side by side in the vehicle front and rear direction on the main body portion 32. The ridge portions 33 are each formed in a cross-sectionally substantially hat shape and extend along the vehicle width direction. The projecting portions 34 are formed on both vehicle width direction end portions of the main body portion 32 in such a way as to continue from the upper surfaces of the ridge portions 33 and project toward the vehicle body upper side.

The vehicle width direction insides of the projecting portions 34 are sloping walls 36. The sloping walls 36 are integrally and continuously disposed (formed) in such a way as to slope obliquely upward and outward in the vehicle width direction from the upper surfaces of the ridge portions 33. Substantially horizontal upper walls 37 are integrally and continuously disposed (formed) on the upper end portions of the sloping walls 36 in such a way as to extend outward in the vehicle width direction from the sloping walls 36. Additionally, the vehicle width direction outside end portions of the projecting portions 34 are end surface portions 38 serving as cross sections that are substantially vertical in relation to the main body portion 32. In other words, the projecting portions 34 are each formed in a substantially trapezoidal shape as seen from the vehicle body front and rear direction (as seen in a front view).

Additionally, the undersurface of the top plate 23 of the upper frame 22 is joined by an adhesive to the upper surfaces of the ridge portions 33 of the core frame 30. Furthermore, the upper surface of the bottom plate 27 of the lower frame 26 is joined by an adhesive to the undersurface of the main body portion 32 of the core frame 30, with jutting portions 56 of a lower reinforcement 46 described later being sandwiched in between. Because of this, the battery frame 20 having a rectangular closed cross-sectional shape is generally configured.

It should be noted that, as shown in FIG. 1, through holes 23A and 33A communicated with one another are formed in plural predetermined positions in the top plate 23 of the upper frame 22 and in the ridge portions 33 of the core frame 30. Flange nuts 54 are joined, coaxially with the through holes 23A and 33A, by an adhesive to the undersurfaces of the ridge portions 33. Additionally, cylindrical collar members 68 made of metal are integrally and coaxially disposed on the upper surfaces of the flange nuts 54, and the collar members 68 are inserted into the through holes 23A and 33A.

Consequently, the fuel cell stack 16 is mounted on the upper surface of the upper frame 22 (the top plate 23) in such a way that the through holes 18A in the leg portions 18 and through holes in the collar members 68 are communicated with one another. In this state, the flange bolts 53 are passed through the through holes 18A in the leg portions 18 and the through holes in the collar members 68 from the vehicle body upper side and are screwed into the flange nuts 54. Thus, the fuel cell stack 16 is fastened and secured to the battery frame 20 (the upper frame 22 and the core frame 30).

Furthermore, as shown in FIG. 1 and FIG. 2, a reinforcement 40 made of metal is disposed in the battery frame 20. The reinforcement 40 is molded of a high tensile steel plate or an ultra-high tensile steel plate, for example. The reinforcement 40 has a right and left pair of upper reinforcements 42, which configure the upper side of the reinforcement 40, and the lower reinforcement 46, which configures the lower side of the reinforcement 40.

Specifically, the longitudinal direction of the right and left pair of upper reinforcements 42 coincides with the vehicle front and rear direction. Undersurfaces of upper main body portions 43, which are the vehicle width direction inside sections of the upper reinforcements 42, are joined by an adhesive G and rivets 55 to the upper surfaces of the sloping walls 24 and the flange portions 25 of the upper frame 22.

Additionally, upper flange portions 44 (which are the vehicle width direction outside sections of the upper reinforcements 42) are integrally and continuously disposed (formed) on the vehicle width direction outside end portions of the upper main body portions 43. The upper flange portions 44 project outward in the vehicle width direction from the flange portions 25 of the upper frame 22 and the end surface portions 38 of the core frame 30.

As shown in FIG. 1 to FIG. 3A, the lower reinforcement 46 has a lower main body portion 47 formed in the shape of a rectangular frame. The lower main body portion 47 is joined to the upper surface of the lower frame 26. Specifically, jutting portions 56 are formed integrally with the lower main body portion 47 on both vehicle width direction end portions of the lower main body portion 47. The jutting portions 56 are each formed in the shape of a rectangular flat plate and jut inward in the vehicle width direction. The longitudinal direction of the jutting portions 56 coincides with the vehicle body front and rear direction. The undersurfaces of the jutting portions 56 are joined by the adhesive G to the upper surface of the bottom plate 27 of the lower frame 26.

Consequently, the core frame 30 is placed inside the lower main body portion 47 in a state in which parts of the jutting portions 56 are sandwiched between the regions between the projecting portions 34 in the vehicle body front and rear direction and the bottom plate 27 of the lower frame 26. In that state, the undersurface of the main body portion 32 is joined by the adhesive G to the upper surface of the bottom plate 27 (see FIG. 3A).

It should be noted that both vehicle body front and rear direction end portions of the lower main body portion 47 are ridge portions 47A. The ridge portions 47A are each formed in a cross-sectionally substantially hat shape and extend in the vehicle width direction. The upper surfaces of the ridge portions 47A are, together with the upper surfaces of the ridge portions 33 of the core frame 30, joined by an adhesive to the undersurface of the top plate 23 of the upper frame 22. Additionally, flange portions continuously disposed on the lower end portions of the ridge portions 47A are also joined by the adhesive G to the upper surface of the bottom plate 27 of the lower frame 26.

Figure 3A:
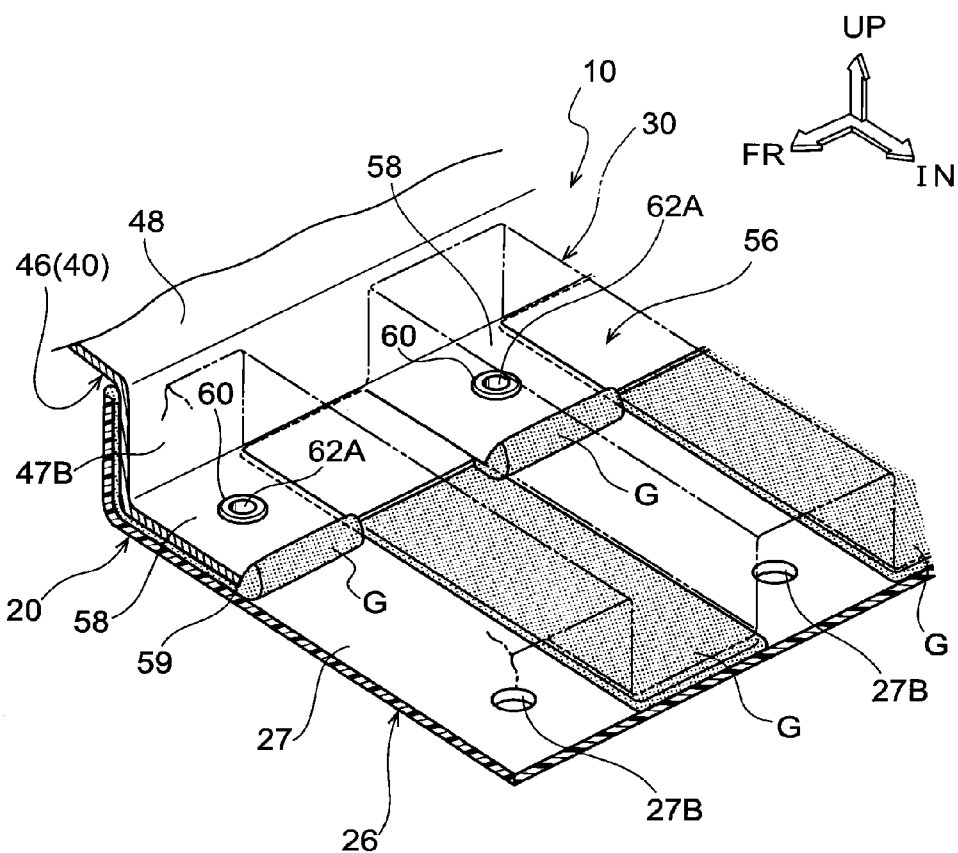
FIG. 3A is an enlarged perspective view showing part of the vehicle battery mounting structure pertaining to the embodiment.

Furthermore, as shown in FIG. 1, FIG. 3A, and FIG. 4, when parts of the jutting portions 56 are sandwiched between the core frame 30 and the lower frame 26, the adhesive G protrudes from the remaining parts of the jutting portions 56 exposed inside the ridge portions 33 of the core frame 30, or in other words from vehicle width direction inside end portions (hereinafter called "distal end portions") 59 of remaining parts (hereinafter called "non-sandwiched portions") 58 of the jutting portions 56 not sandwiched between the core frame 30 and the lower frame 26.

Additionally, the distal end portions 59 of the non-sandwiched portions 58 are covered by the adhesive G protruding from the distal end portions 59 and rising upward. It should be noted that, when the distal end portions 59 of the non-sandwiched portions 58 have a configuration where they are covered by the adhesive G rising upward, there is the concern that water droplets entering the projecting portions 34 will remain on the upper surfaces of the non-sandwiched portions 58. For that reason, open portions for water drainage are formed in the non-sandwiched portions 58 and in the bottom plate 27 of the lower frame 26.

Specifically, through holes 27A that serve as first open portions and have a circular shape, for example, are formed in both vehicle width direction end portions of the bottom plate 27 on which the non-sandwiched portions 58 are overlaid and to which the non-sandwiched portions 58 are joined. Additionally, through holes 58A that serve as second open portions, have a circular shape, and are smaller in diameter than the through holes 27A are formed in the non-sandwiched portions 58. The through holes 58A become coaxially communicated with the through holes 27A when the non-sandwiched portions 58 are overlaid on the upper surface of the bottom plate 27.

Figure 3B:
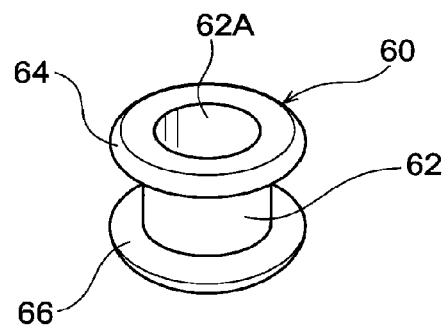
FIG. 3B is a perspective view of a grommet that configures the vehicle battery mounting structure pertaining to the embodiment.

Moreover, insulating (made of rubber) grommets 60 are fitted into the through holes 58A. As shown in FIG. 3B, the grommets 60 are each molded of polyolefin thermoplastic elastomer, for example, in the shape of a ring. Specifically, the grommets 60 each have a cylinder portion 62, an upper flange 64, and a lower flange 66. The upper flange 64 is integrally disposed, heading outward in the radial direction, on the upper end portion of the cylinder portion 62. The lower flange 66 is integrally disposed, heading outward in the radial direction, on the lower end portion of the cylinder portion 62.

As shown in FIG. 4, the upper surface (the surface that is not in contact with the non-sandwiched portion 58) of the outer rim portion of the upper flange 64 and the undersurface (the surface that is not in contact with the non-sandwiched portion 58) of the outer rim portion of the lower flange 66 are sloping surfaces 64A and 66A, respectively. Additionally, the thickness of the upper flange 64 and the lower flange 66 excluding the sloping surfaces 64A and 66A is a thickness (e.g., 1.5 mm) with which it is easy for the grommet 60 to be fitted into the through hole 58A and hard for the grommet 60 to come out from the through hole 58A. Furthermore, the outer diameter of the cylinder portion 62 is the same as the inner diameter of the through hole 58A. Furthermore, the axial direction length of the region of the cylinder portion 62 excluding the upper flange 64 and the lower flange 66 is substantially the same as the thickness of the non-sandwiched portion 58 (the axial direction length of the through hole 58A) in which the through hole 58A is disposed.

Consequently, when the upper flange 64 and the lower flange 66 of the grommet 60 are elastically deformed to insert the grommet 60 into the through hole 58A and the upper flange 64 and the lower flange 66 return to their original shape, the grommet 60 becomes attached to a peripheral edge portion 58B (the region exposed from the through hole 27A) configuring the through hole 58A of the non-sandwiched portion 58.

In other words, the grommet 60 is disposed in (attached to) the non-sandwiched portion 58 as a result of the peripheral edge portion 58B configuring the through hole 58A of the non-sandwiched portion 58 being fitted between the upper flange 64 and the lower flange 66. Because of this, water droplets entering the projecting portion 34 and existing on the upper surface of the non-sandwiched portion 58 are drained to the outside of the battery frame 20 from a through hole 62A formed in the cylinder portion 62 of the grommet 60 and the through hole 27A in the bottom plate 27.

It should be noted that the length to which the upper flange 64 and the lower flange 66 jut outward in the radial direction from the outer peripheral surface of the cylinder portion 62 as well as the angle of inclination of the sloping surfaces 64A and 66A are appropriately decided in consideration of the ease with which the grommet 60 is fitted into the through hole 58A and the difficulty with which the grommet 60 comes out from the through hole 58A. Furthermore, the outer rim portion of the lower flange 66—that is, the sloping surface 66A—is covered by the adhesive G protruding into the through hole 27A when the jutting portion 56 including the non-sandwiched portion 58 is joined by the adhesive G to the bottom plate 27 of the lower frame 26 (see FIG. 4).

Furthermore, as shown in FIG. 3A and FIG. 4, inside the ridge portions 33, through holes 27B having a circular shape, for example, are formed in the bottom plate 27 of the lower frame 26 on the vehicle width direction inside of the non-sandwiched portions 58. Consequently, water droplets existing on the upper surface of the bottom plate 27 on the vehicle width direction inside of the non-sandwiched portions 58 are drained to the outside of the battery frame 20 from those through holes 27B.

As shown in FIG. 1 and FIG. 2, the sections of the lower main body portion 47 on the vehicle width direction outsides of the jutting portions 56 are side wall portions 47B. The side wall portions 47B are formed substantially vertically toward the vehicle body upper side in such a way as to follow the side wall portions 28 of the lower frame 26. The height of the side wall portions 47B is substantially the same as the height of the side wall portions 28 of the lower frame 26.

Furthermore, lower flange portions 48 are continuously disposed (formed) on the vehicle width direction outside end portions of the side wall portions 47B. The lower flange portions 48 are formed integrally with the side wall portions 47B and project outward in the vehicle width direction from the end surface portions 38 of the core frame 30 and the upper end portions of the side wall portions 28 of the lower frame 26. Additionally, the upper flange portions 44 and the lower flange portions 48 are overlaid on and joined to one another by the rivets 55 (or an adhesive).

Flange portions 50 are configured by the upper flange portions 44 and the lower flange portions 48. The flange portions 50 serve as regions at which the battery frame 20 is secured to the under members 14 (the undersurface side of the floor panel 12). Additionally, as shown in FIG. 1, plural through holes 50A for passing through the flange bolts 53 are formed in the flange portions 50 along the vehicle body front and rear direction.

Consequently, by passing the flange bolts 53 through the through holes 50A and the through holes 14A from the vehicle body lower side and screwing them into the weld nuts 52, the battery frame 20 becomes fastened and secured to the under members 14 via the reinforcement 40 (the flange portions 50).

Furthermore, as shown in FIG. 1, the vehicle width direction outside end portions of the floor panel 12 are bent portions 12A formed bent toward the vehicle body upper side. The bent portions 12A are joined by welding, for example, to inner panels 72 of rockers 70 made of metal. The rockers 70 are each configured to include the inner panel 72, which has a cross-sectionally substantially hat shape, and an outer panel 74, which has a cross-sectionally substantially hat shape.

Furthermore, energy absorbing members 80 made of metal that absorb a crash load during a side crash are disposed between the vehicle body lower sides of the rockers 70 (including both vehicle width direction end portions of the floor panel 12) and the battery frame 20. The energy absorbing members 80 are each configured to include an inner member 76 and an outer member 78. The inner member 76 is placed on the vehicle width direction inside in proximity to the side wall portion 28. The outer member 78 is placed on the vehicle width direction outside of the inner member 76 in such a way that there is a predetermined gap between the outer member 78 and the inner member 76.

Next, the action of the vehicle battery mounting structure 10 having the above configuration will be described.

As shown in FIG. 4, the distal end portions 59 of the non-sandwiched portions 58 of the jutting portions 56 of the lower reinforcement 46 are covered by the adhesive G protruding from the distal end portions 59 and rising upward. Consequently, the occurrence of rusting caused by galvanic corrosion at the distal end portions 59 of the non-sandwiched portions 58 can be controlled or prevented.

Furthermore, open portions for water drainage—that is, the through holes 58A—are formed in the non-sandwiched portions 58. Additionally, the ring-shaped grommets 60 having the through holes 62A are fitted into the through holes 58A. Furthermore, the through holes 27A coaxially communicated with the through holes 62A (the through holes 58A) are formed in the bottom plate 27 of the lower frame 26.

Consequently, even if water droplets entering the projecting portions 34 are on the upper surfaces of the non-sandwiched portions 58, the water droplets are drained from the open portions configured by the through holes 62A (the through holes 58A) and the through holes 27A. Thus, the occurrence of rusting caused by galvanic corrosion at the upper surfaces of the non-sandwiched portions 58 can be controlled or prevented (antirust performance can be improved).

Furthermore, the insulating grommets 60 are fitted into the through holes 58A and the peripheral edge portions 58B are covered by the grommets 60. In other words, the peripheral edge portions 58B configuring the through holes 58A are prevented by the grommets 60 from coming into contact with the bottom plate 27. Consequently, the occurrence of rusting caused by galvanic corrosion at the peripheral edge portions 58B can be controlled or prevented.

It should be noted that, even if rusting were to occur at the peripheral edge portions 58B configuring the through holes 58A, the rust can be hidden by the grommets 60. Consequently, the occurrence of drawbacks such as the external appearance (the visual appearance) of the battery frame 20 being compromised can also be controlled or prevented.

Furthermore, when the outer rim portions—that is, the sloping surfaces 66A—of the lower flanges 66 of the grommets 60 are covered by the adhesive G protruding into the through holes 27A, moisture can be prevented from entering from the gaps between the lower flanges 66 and the peripheral edge portions 58B. Consequently, rusting caused by galvanic corrosion in the areas (the peripheral edge portions 58B) around the through holes 58A can be controlled or prevented even more.

Moreover, the adhesive G protruding into the through holes 27A is contained by the lower flanges 66 of the grommets 60. Consequently, there is no concern that the protruding adhesive G will enter the through holes 62A in the grommets 60 (block the through holes 62A). Thus, there is no concern that work for scraping out the protruding adhesive G from the through holes 62A will arise.

Furthermore, the sloping surfaces 64A and 66A are formed on the outer rim portions of the upper flanges 64 and the outer rim portions of the lower flanges 66 of the grommets 60, so when elastically deforming the grommets 60 to fit the grommets 60 into the through holes 58A, it is easy to insert the grommets 60 into the through holes 58A. In other words, by forming the sloping surfaces 64A and 66A on the upper flanges 64 and the lower flanges 66, it can be made easy to fit the grommets 60 into the through holes 58A.

Furthermore, when the sloping surfaces 64A and 66A are formed on the outer rim portions of the upper flanges 64 and the outer rim portions of the lower flanges 66 of the grommets 60, there is no concern that one's fingers will roll up the upper flange 64 and the lower flange 66 even if one's fingers touch the upper flange 64 and the lower flange 66 of the grommets 60 when, for example, joining the jutting portions 56 (including the non-sandwiched portions 58) to the bottom plate 27. In other words, by forming the sloping surfaces 64A and 66A on the upper flanges 64 and the lower flanges 66, it can be made hard for the grommets 60 to come out from the through holes 58A.

The vehicle battery mounting structure 10 pertaining to the present embodiment has been described above on the basis of the drawings, but the vehicle battery mounting structure 10 pertaining to the present embodiment is not limited to what is shown in the drawings and can appropriately undergo design changes without departing from the spirit of the present invention. For example, the reinforcement 40 is not limited to being molded of a high tensile steel plate or an ultra-high tensile steel plate and may also be molded of an aluminum alloy or iron having a certain degree of hardness.

Furthermore, the flange portions 50 of the reinforcement 40 are not limited to a configuration where they are fastened and secured to the under members 14 joined and secured to the undersurface of the floor panel 12 and, for example, may also have a configuration where they are fastened and secured to non-illustrated brackets joined and secured to the undersurface of the floor panel 12 or the undersurfaces of the under members 14.

In other words, the flange portions 50 of the reinforcement 40 may also have a configuration where they are indirectly joined to the floor panel 12 or the under members 14. Furthermore, the battery frame 20 in the present embodiment is not limited to supporting the fuel cell stack 16.

Moreover, as long as it is ensured that moisture does not enter from the gaps between the lower flanges 66 of the grommets 60 and the peripheral edge portions 58B configuring the through holes 58A of the non-sandwiched portions 58, the vehicle battery mounting structure 10 may also be given a configuration where the sloping surfaces 66A of the lower flanges 66 are not covered by the adhesive G protruding into the through holes 27A formed in the bottom plate 27.

Furthermore, as long as it is easy for the grommets 60 to be fitted into the through holes 58A in the non-sandwiched portions 58 and hard for the grommets 60 to come out from the through holes 58A, the vehicle battery mounting structure 10 may also be given a configuration where the sloping surfaces 64A and 66A are not formed on the upper flanges 64 and the lower flanges 66.

The disclosure of Japanese Patent Application No. 2014-216288 filed on Oct. 23, 2014, is incorporated herein by reference.

All documents, patent applications, and technical standards mentioned herein are incorporated herein by reference to the same extent as if each individual document, patent application, or technical standard was specifically and individually indicated to be incorporated by reference.

What is claimed is:

1. A vehicle battery mounting structure, comprising:
a lower frame made of fiber-reinforced resin that has a first open portion for water drainage, the lower frame configuring, together with an upper frame, a battery frame that supports a battery;
a lower reinforcement made of metal that has a second open portion for water drainage having a smaller open area than the first open portion, the lower reinforcement being joined to the lower frame in a state in which the second open portion is communicated with the first open portion; and
an insulating grommet that is formed in the shape of a ring having an upper flange and a lower flange,
wherein a peripheral edge portion configuring the second open portion of the lower reinforcement is fitted between the upper flange and the lower flange, and
the insulating grommet is disposed at the lower reinforcement.

2. The vehicle battery mounting structure according to claim 1, wherein:
the lower reinforcement is joined by an adhesive to an upper surface of the lower frame; and
an outer rim portion of the lower flange is covered by the adhesive, which has protruded out toward the first open portion.

3. The vehicle battery mounting structure according to claim 1, wherein surfaces of an outer rim portion of the upper flange and an outer rim portion of the lower flange that are not in contact with the lower reinforcement are each sloping surfaces.

4. The vehicle battery mounting structure according to claim 1, wherein:
the grommet is equipped with a cylinder portion;
the upper flange is integrally disposed, extending outward in a radial direction, at an upper end portion of the cylinder portion;
the lower flange is integrally disposed, extending outward in the radial direction, at a lower end portion of the cylinder portion; and
the cylinder portion is inserted into the second open portion.

5. The vehicle battery mounting structure according to claim 4, wherein the grommet is made of rubber and is elastically deformable.

6. The vehicle battery mounting structure according claim 4, wherein an outer diameter of the cylinder portion is the same as an inner diameter of the second open portion.

7. The vehicle battery mounting structure according to claim 2, wherein a distal end portion of the lower reinforcement that is joined, by the adhesive, on the upper surface of the lower frame is covered by the adhesive, which has protruded out from the distal end portion of the lower reinforcement and swollen up from the upper surface of the lower frame.

* * * * *